US 6,698,336 B1

(12) United States Patent
Siegel et al.

(10) Patent No.: US 6,698,336 B1
(45) Date of Patent: Mar. 2, 2004

(54) BAKING DISH FOR COOKING, SERVING AND STORING FOOD

(75) Inventors: Jeff Siegel, Kings Point, NY (US); Adam Krent, Brooklyn, NY (US); David Linn Burnett, New York, NY (US); William J. Lazaroff, Floral Park, NY (US)

(73) Assignee: Lifetime Hoan Corporation, Westbury, NY (US)

( * ) Notice: Subject to any disclaimer, the term of this patent is extended or adjusted under 35 U.S.C. 154(b) by 0 days.

(21) Appl. No.: 10/389,592

(22) Filed: Mar. 17, 2003

(51) Int. Cl.[7] .......................... A47J 27/00; A47J 37/00; A47J 37/10
(52) U.S. Cl. ..................... 99/340; 99/403; 99/422; 99/426; 99/428; 99/442; 220/573.1; 220/912; 249/136; 249/170
(58) Field of Search ................. 99/339, 340, 403–410, 99/426–442, 422–425, DIG. 15; 220/625, 4.03, 4.01, 912, 573.1; 229/235, 236; 126/369, 373.1; 249/136, 117, 165, 121, 170, 157, 160, 147, 163, 61, DIG. 1; 426/496, 505, 523

(56) References Cited

U.S. PATENT DOCUMENTS

| | | | | |
|---|---|---|---|---|
| 334,867 A | * | 1/1886 | Inman ....................... 220/260 |
| 559,788 A | * | 5/1896 | Perrottet ................... 249/170 |
| 993,914 A | * | 5/1911 | Truman ..................... 249/157 |
| 2,552,702 A | * | 5/1951 | Woolfolk ................. 220/4.03 |
| 2,622,187 A | * | 12/1952 | Welch ....................... 219/735 |
| 4,644,858 A | * | 2/1987 | Liotto et al. ............... 99/449 |
| 5,193,524 A | * | 3/1993 | Loyd et al. ............. 126/374.1 |
| 5,582,389 A | * | 12/1996 | Greene ....................... 249/61 |
| 5,676,050 A | * | 10/1997 | Beck .......................... 99/428 |
| 5,678,475 A | * | 10/1997 | Villar Otero ............... 99/432 |
| 5,771,787 A | * | 6/1998 | Hirano ....................... 99/426 |
| 5,829,343 A | * | 11/1998 | Sunshine .................... 99/432 |
| 6,006,943 A | * | 12/1999 | Laney ...................... 220/379 |

* cited by examiner

Primary Examiner—Timothy F. Simone
(74) Attorney, Agent, or Firm—Goodman & Teitelbaum, Esqs.

(57) ABSTRACT

A baking dish includes a generally shallow platter made of ceramic material suitable to withstand a baking environment and having a baking surface defining a supporting plane on which a baked product can be made. A substantially upright continuous wall in the form of a ring generally conforming to the shape of the baking surface is provided that has a height dimension when supported on the baking surfaces relative to the supporting plane to define a generally cylindrical space for receiving and containing a food product to be baked. The platter and ring have substantially conforming peripheries. A laterally extending bead or a protuberance extends about the periphery of the platter and a deformable engaging member in the form a peripheral lip is provided about the periphery of the ring for removably attaching the ring to the platter about the periphery and for providing a generally sealed connection at the mating surfaces of the platter and wall of the ring. A cover has a substantially upright continuous wall conforming to the periphery of the baking surface and is closed at one end and open at the other end. The cover is provided with second engagement member similar to the one provided on the ring for removably attaching the cover to the platter. In this way the ring can be initially attached to the platter for baking the food product and substantially the ring can be replaced by the cover to store the baked product within a substantially sealed enclosure.

13 Claims, 5 Drawing Sheets

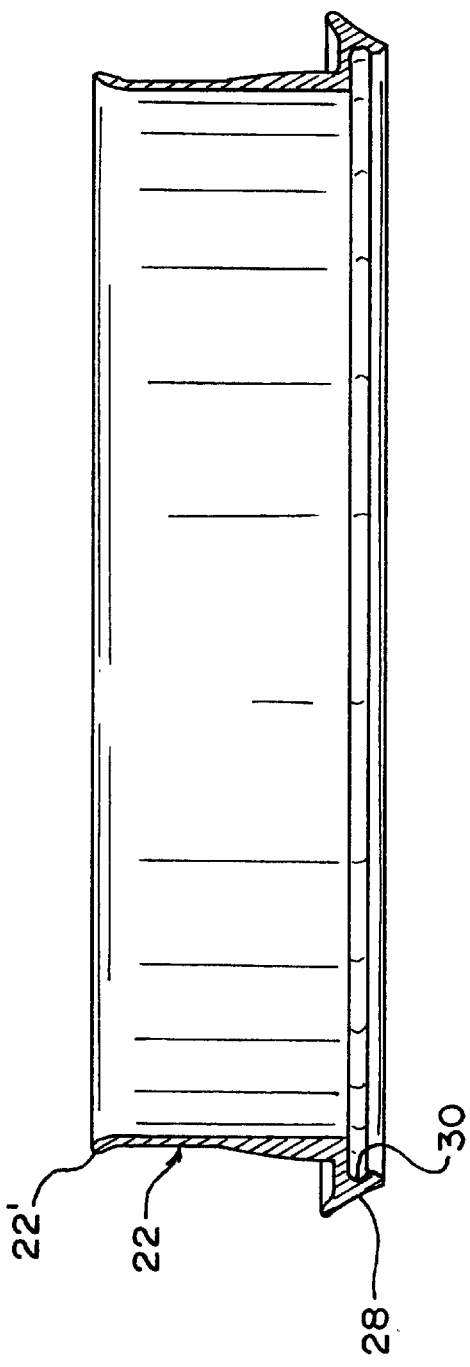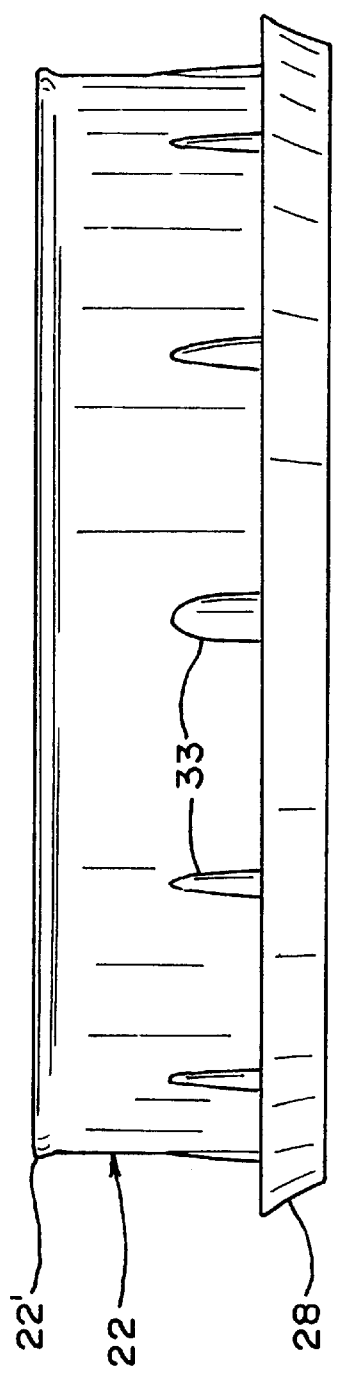

BAKING DISH FOR COOKING, SERVING AND STORING FOOD

BACKGROUND OF THE INVENTION

1. Field of the Invention

The invention generally relates to baking accessories and, more particularly, to a baking dish for cooking, serving and storing food.

2. Description of the Prior Art

Silicone is a good choice for bakeware because of its high heat-resistance properties. Another advantage is that it has good release properties, which means that it requires no greasing and cleanup, either by hand or in the dishwasher, is very easy. Others have embraced silicone in bakeware and have for the most part emulated the shape of traditional metal bakeware in the silicone molds. This bakeware cooks as well as traditional bakeware, but there are several drawbacks:

The cost is higher;

The pans are flexible so it helps to have a stiff metal sheet underneath to help slide it into the oven;

The cooking times can be a little longer;

There is still a difficulty in removing the food from the forms other than the muffins (which can be pushed out individually).

The most popular all-silicone baking form, and one that is predominantly used in commercial baking and in the restaurant industry, is the muffin mold.

Silicone bakeware has been on the market for several years but has not been widely successful for home use. However, additional features would have to be added to the bakeware forms to overcome the public's skepticism of cooking in plastic.

The release properties and the ability to be molded into virtually limitless shapes are important consideration. Another objective is to see if the silicone baking apparatus could replace all of the traditional bakeware forms on the market as well as overcome some of the problems inherent in baking in general. Several products attempt to overcome problems in baking.

A silicone baking sheet is very useful for baking cookies, breads or pastries. It has to be used on top of a regular cookie sheet, or on some other flat sheet. When cooking is completed, the silicone baking sheet can simply be lifted off to shake the contents off the sheet.

A traditional springform pan with a glass bottom has just a metal sheet on the bottom. These types of pans are used for cakes that cannot be popped or lifted out of a mold. As a result of releasing the spring, the sides can be lifted away after baking, leaving a straight walled cake sitting on a tray. The tray can be easily moved around or set on a serving platter. This design overcomes the problems of a tricky release from a mold and even allows for cakes with straight walls (no draft). The springform pan is most often used for cheesecakes. However, with the springform pan the metal and spring parts are difficult to clean. The advantage of having a glass bottom is that it will not scratch when you cut it, and the glass is very easy to clean.

The advantage of a loose-bottom pan is that the cake can be pushed up from the bottom, rather than being pried out. This type of pan is not likely to be non-stick coated because of the edge on a flat disk. Because of this, this pan must be greased before use.

A ceramic baker is formed of glazed ceramic. The material absorbs, transfers and retains heat well. Because of its glazing, it is easy to clean and is non-stick (it needs little or no grease).

The ceramic baker is microwave-, oven- and dishwasher-safe. It will not discolor or become scratched from knives or metal utensils. The disadvantage of this baker is that it is heavy, that there are risks of damage during shipment and ceramic incurs a larger import duty rate.

SUMMARY OF THE INVENTION

In order to overcome the disadvantages inherent in known baking dishes, a baking dish in accordance with the present convention comprises a generally shallow platter made of a material suitable to withstand a baking environment and having a baking surface defining a supporting plane on which a baked product can be made. A substantially upright continuous wall is provided in the form of a ring generally conforming to the shape of the baking surface and having height dimensions when supported on said baking surface relative to said supporting plane defining a generally cylindrical space for receiving and containing a food product to be baked. Said platter and wall have substantially conforming peripheries. First attaching means is provided on said platter and second attaching means is provided on said ring for removably attaching said ring to said platter for providing a generally sealed connection at the mating surfaces of said platter and wall. A cover is provided having a substantially upright continuous wall conforming to said periphery of said baking surface and is closed at one end and open at the other end in planes normal to said upright wall of said cover. Said cover is provided with second attaching means for removably attaching said cover to said plate. In this manner, said ring can be initially attached to said plate for baking a food product and subsequently said ring can be replaced by said cover to store the baked product within a substantially sealed enclosure.

BRIEF DESCRIPTION OF THE DRAWINGS

FIG. 5 is a cross-section of the upright wall or ring taken along a diameter passing through the center of the baking dish shown in FIGS. 1 and 2;

FIG. 6 is a side elevational view of the upright wall or ring shown in FIG. 5;

DESCRIPTION OF THE PREFERRED EMBODIMENT

Figure 1:
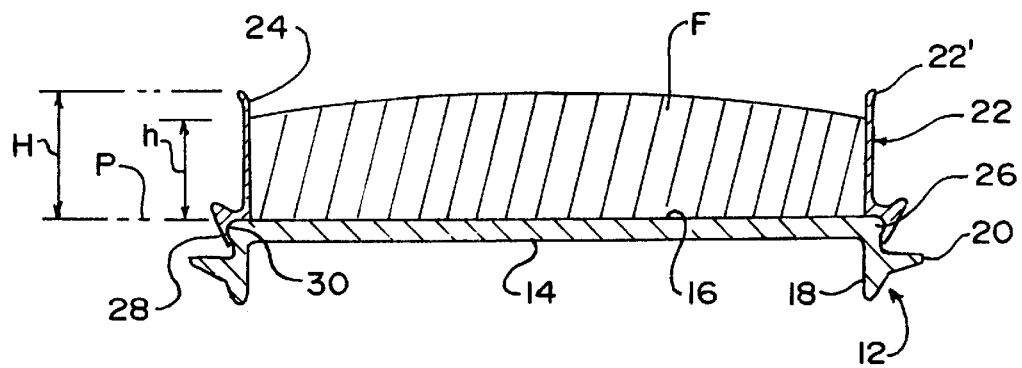
FIG. 1 is a cross-section of a baking dish in accordance with the present convention, showing an upright cylindrical ring mounted on a platter or base such as when the baking dish is used while baking of a food product.
Figure 2:
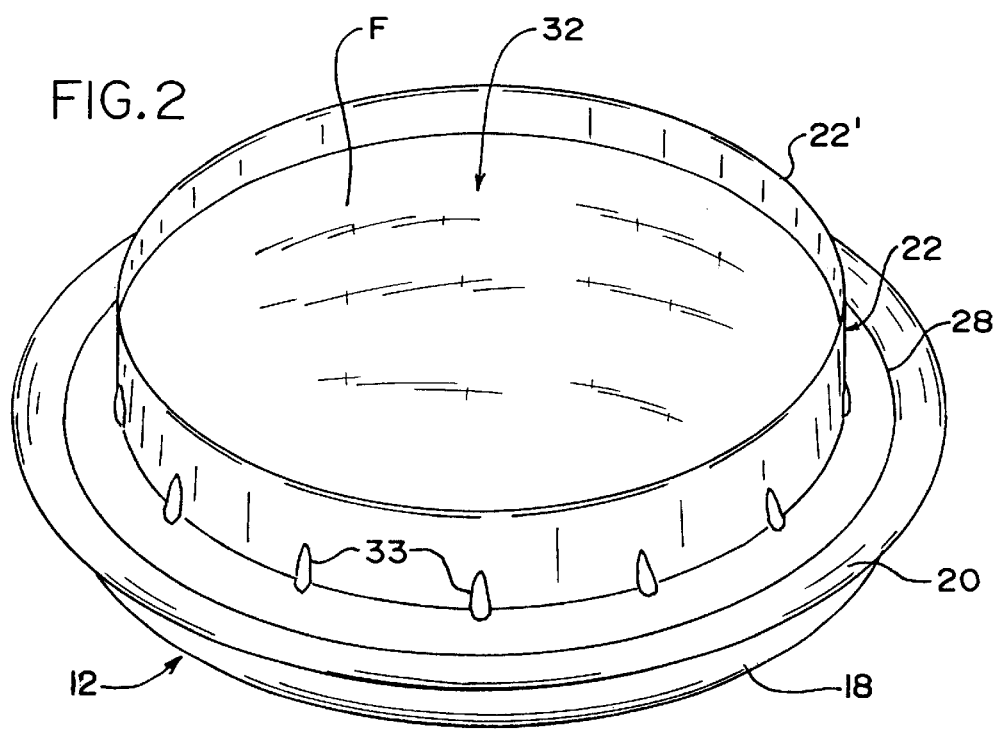
FIG. 2 is a perspective view of the baking dish shown in FIG. 1.

The above and other objects of the invention may be more readily seen when viewed in conjunction with the accompany drawings, wherein:

Turning now to the figures, in which identical and similar parts designated by the same reference numerals throughout, and first referring to FIGS. 1 and 2, a baking dish in accordance with the present invention is generally designated by the reference to numeral 10.

Figure 3:
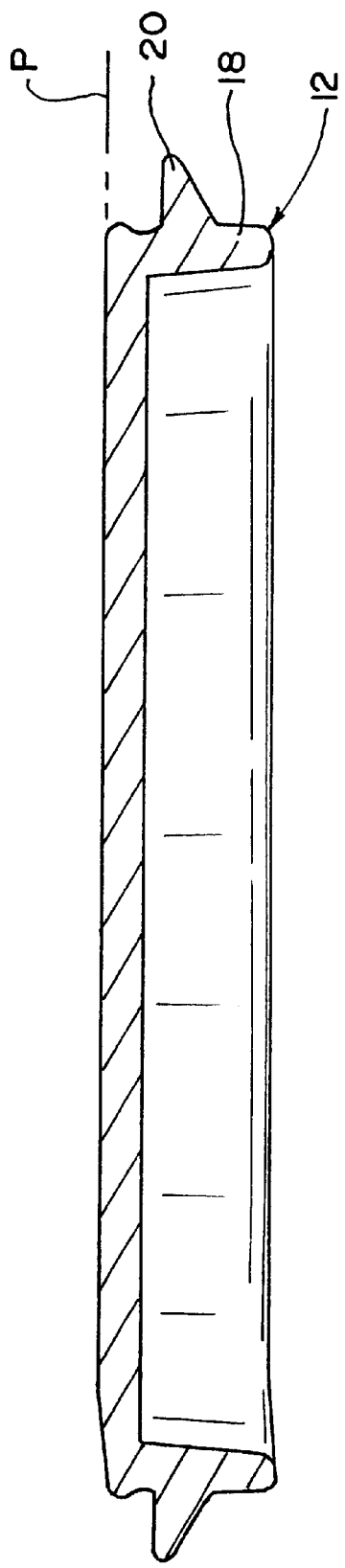
FIG. 3 is a cross-sectional view, taken along a diameter passing through the center of the baking dish shown in FIGS. 1 and 2.
Figure 4:
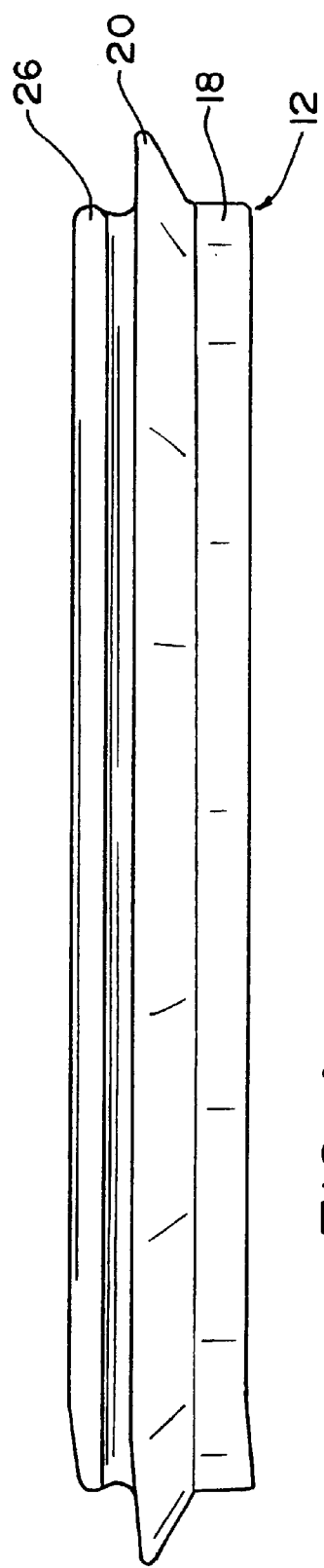
FIG. 4 is a side elevational view of the platter or base shown in FIG. 3.
Figure 7:
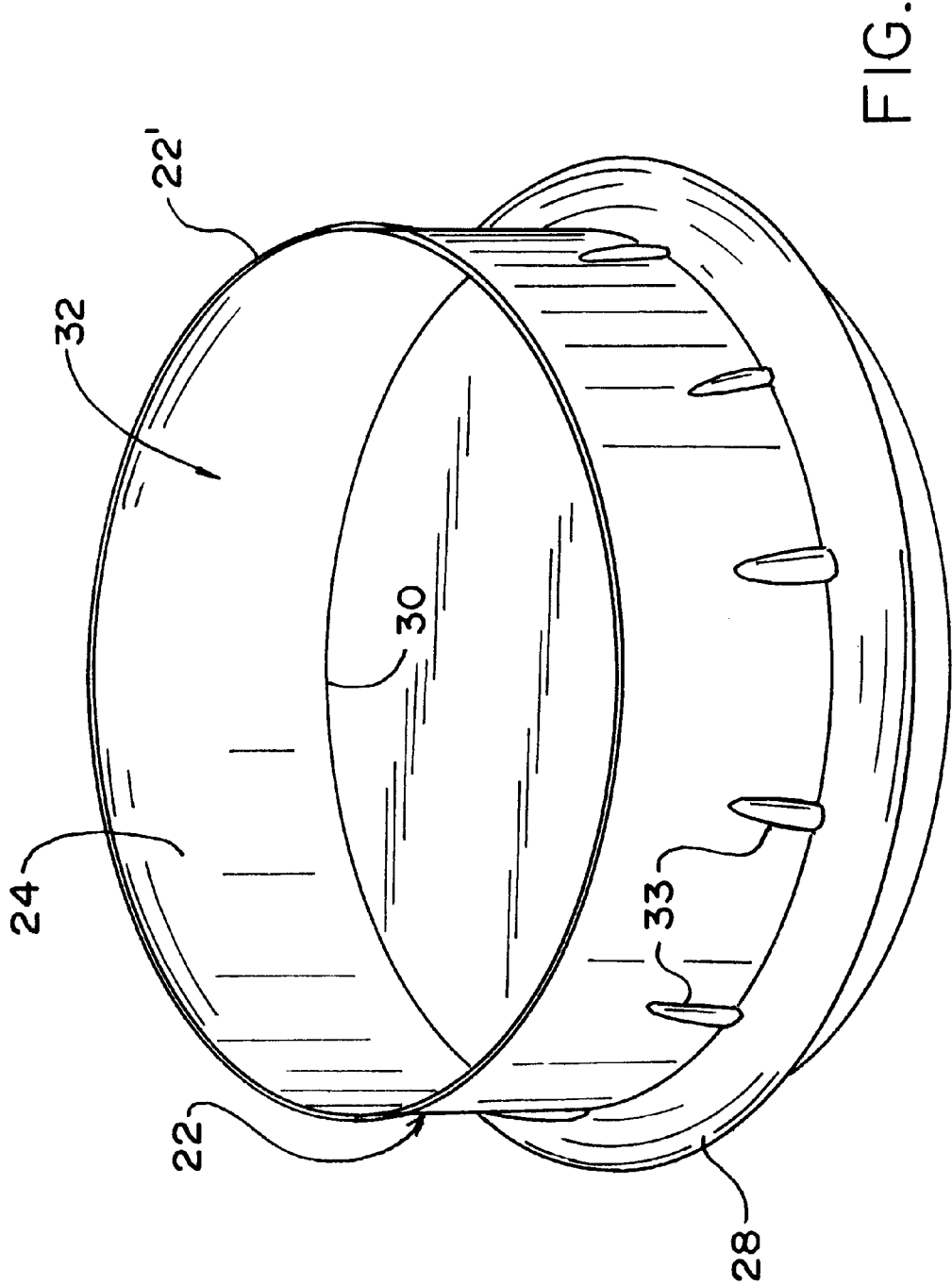
FIG. 7 is a perspective view of the upright wall or ring shown in FIGS. 5 and 6.

The baking dish 10 includes a generally shallow platter or base 12. While the preferred embodiment describes a baking dish that is generally circular it will be evident that the invention can be applied to other shaped baking dishes, including square, rectangular, oval, etc. Thus, in the embodiment illustrated in FIGS. 1–4, the base 12 is in a form of a circular platter made of a material suitable to withstand a baking environment. In the presently preferred embodiment, the base or platter 12 is made of a ceramic material. With a ceramic platter, a baked product such as a cake can be cut without the risk of scratching the platter. The base or platter 12 includes a top wall 14 which, as indicated, is circular in shape and defines a baking surface 16 as the upper surface thereof. The top wall 14 defines, in this embodiment, a generally circular peripheral edge from which there extends downwardly a skirt 18 that serves as a spacer to raise the top wall 14 above a support surface within an oven or the like. While the skirt 18 is shown somewhat inclined outwardly, this is not critical. Protruding about the skirt or spacer 18 is a radially outwardly protruding rim 20 configured and dimensioned to facilitate gripping by a user. The rim 20, therefore, is configured to be easily gripped by the fingers of a user when the baking dish needs to be picked up or moved. The baking surface 16 defines a supporting plane P (FIG. 3) on which a baked product can be made.

A substantially upright continuous wall 22 in the form of a cylindrical ring 22 is provided that generally conforms to the shape of the baking surface 16. Thus, as illustrated in FIGS. 1 and 2 and 5–7 the upright wall or ring 22 forms a circular cylindrical wall that is open at the top and bottom axial ends and has a height dimension H (FIG. 1), when supported on the baking surface 16 relative to the supporting plane, to define a generally cylindrical space 24 for receiving and containing a food product F to be baked. In FIG. 1, the food product F is shown in the form of a cake achieving a height h above the baking surface 16 so that the height of the ring H needs to exceed the anticipated height h of the food product to be baked.

As indicated, the base or platter 12 and the wall of the ring 22 have substantially conforming peripheries. A first attaching element is provided on the base or platter 12, in the form of a radially outwardly extending protuberance or bead 26 that essentially extends about the entire periphery of the base. A second attaching element is provided along the bottom edge of the ring 22 for removably attaching the ring to the base about the peripheries. The attaching element on the ring is in the form of a resiliently mounted peripheral lip 28 that defines a seat 30 that generally conforms to the shape of the protuberance 26. When the ring is urged downwardly against the base or platter 12 the engaging member in the form of the peripheral lip 28, is forced to temporarily and resiliently deflect radially outwardly to receive and accommodate the protuberance 26 within the seat 30. Thus, the engaging member 28 essentially snaps over the protuberance 26 and forms a pressure-fit or interference-fit connection that provides a generally sealed connection of the mating surfaces of the platter and the ring. Once a seal is formed between the ring 22 and the base 12 a food product, which may be in the form of a liquid or liquid-like cake mix, can be poured into the cylindrical space 24 and baked on the baking surface 16 without any of the food contents passing through the mating surfaces. While one embodiment or one example of an engaging or locking mechanism has been illustrated, it will be clear that different engaging members may be used, with different degrees of advantage, as long as the engaging or locking members permit ring 22 to be selectively attached and detached from the base 12 and, when mounted on the base 12, to provide a seal between these two components.

By providing an opening 32 at the top axial end of the ring 22, the food product is exposed to the heat in the oven and can be baked and the top surface of the food product F can be browned as desired.

Additionally, optional reinforcing ribs 33 may be provided and spaced about the periphery of the ring 22 to rigidify and strengthen the ring. In the presently preferred embodiment, the ring is preferably made of silicone, so that a food product such as a cake is not likely to stick to the side, and the dish requires little or no grease. Because silicone is not extremely rigid, the reinforcing ribs 33 help to stiffen the wall of the silicone ring.

By making base 12 from a ceramic material and the ring 22 from silicone, these materials being non-metallic, this makes it possible to use the baking dish in a microwave oven as well.

Figure 8:
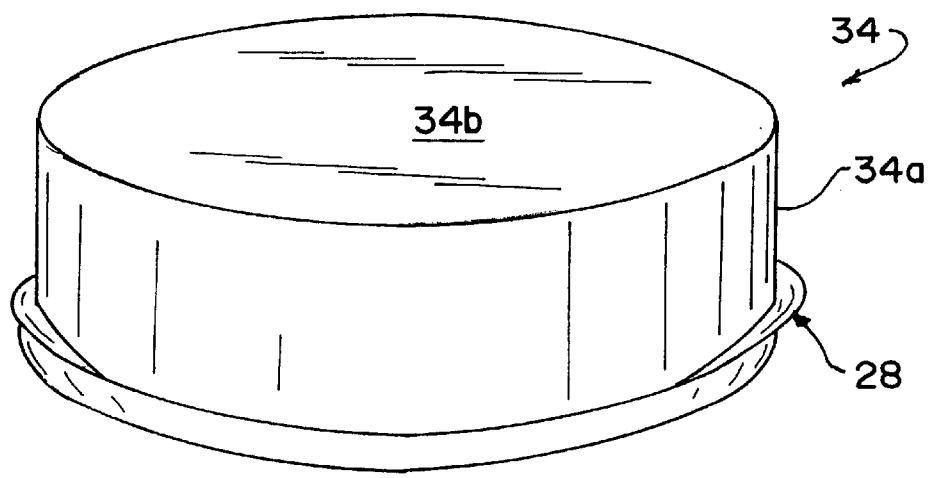
FIG. 8 is a perspective view of a cover that forms part of the invention and is used to replace the upright wall or ring after the food product has been baked.
Figure 9:
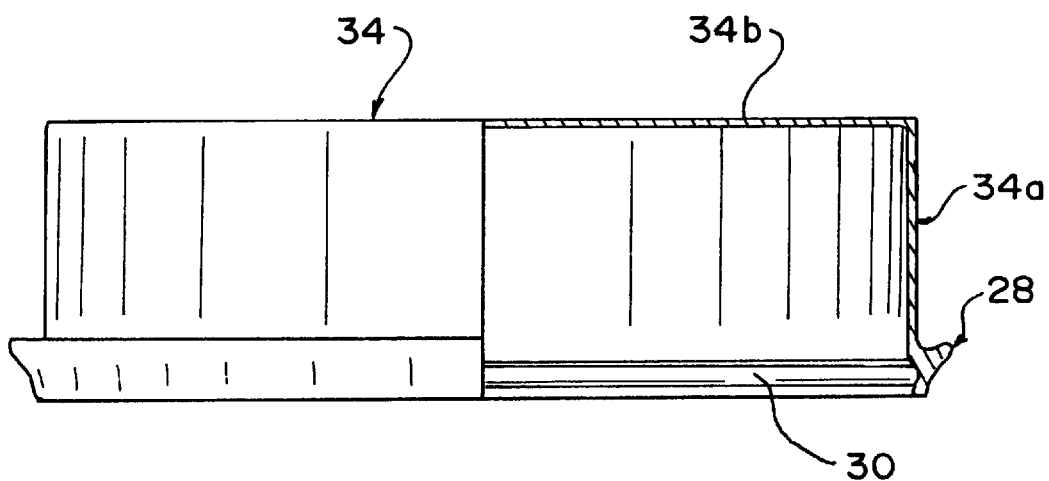
FIG. 9 is the side elevational view of the cover shown in FIG. 8, partially in cross-section to illustrate the details of the cover construction.

Referring to FIGS. 8 and 9, a cover 34 is provided that has a substantially upright continuous side wall 34a and a top or upper wall 34b. The side wall 34a generally conforms to the periphery of the baking surface 16. The cover 34 is provided along the lower or bottom edge of the side wall 34a with an engaging member similar to that used with the ring 22: Thus, the cover 34 is provided with a peripheral lip 28, with a seat 30 for a snappingly receiving the same protuberance 26 on the base or platter 12 when the cover is urged downwardly.

It will be evident, therefore, from the above description that the ring 22 can initially be attached to the base or platter 12 for baking a food product and substantially the ring 22 can be removed and replaced by the cover 34 to store the baked product within a substantially sealed enclosure.

The specific material that the cover 34 is made from is not critical, although it is presently preferred that the cover be made from a transparent material so that the food product stored within the baking dish can be viewed through it. In the presently preferred embodiment, the cover 34 is preferably made from a clear polycarbonate, while the engaging member 28 can be made from a Santoprene over-molded onto the polycarbonate at the lower edge thereof as shown.

The baking dish of the present invention, therefore, allows the food contents to be cooked in and served from the same dish. This is achieved by use of a removable ring 22 that surrounds the platter 12 of a cooking dish. When the baking is complete, the ring is removed. The dish has a number of advantages. First, there is little likelihood of damaging a cake, for example, in removing the ring, as there is in lifting a cake out of a mold. Second, with this baking dish, one can bake a cake with almost vertical sides, which has a better appearance. The third advantage is that the cooking, serving and storing of the cake can be achieved all while the cake is on the same platter. The sealing, initially, of the ring and the base or platter is accomplished by pressing down on the side lateral wall and a firm seal is assured by pressing down against the platter until the ring moves no further once the protuberance or bead 26 is fully seated within the groove 30. The unique use of a rim around a sealing area allows for easy removal. A second removal rim 22' along the top edge of the ring also facilitates removal. Sealing is achieved by means of a common type of beading with an equal or greater size to the cut-out in the mating part. Which part bears the bead or the protuberance and which part bears the seated or groove is not critical and this may be reversed from the arrangement shown.

The baking dish not only replaces the traditional formed pans, but also the straight-sided spring form pans as well. It can be used for other culinary applications such as freezing ice cream cakes. The present vention also lends itself to the shape of other baking goods, including sheet cake, loaf, muffin, and other irregular shapes.

The invention has the following advantages over the prior known baking forms and pans:

The release properties of the silicone material and the ceramics materials mean that the cake pan does not have to be greased before use and will clean up easily.

The design allows for easy cleanup with no places where water or food may become trapped.

Because the silicone sides are lifted up and away after baking, there is no risk of damaging the cake (as opposed to when lifting out the cake).

Because the sides are lifted off for removal, transfer to a serving platter is not necessary (the ceramic platter doubles as an elegant serving piece).

Because the platter is made of ceramic, the cake can be cut without the risk of damaging the surface.

All materials are safe in the oven, microwave, freezer and dishwasher.

Because the two components are made of glazed ceramic and silicone, the product can be offered in a variety of colors.

This invention will lend itself to other bakeware forms including loaf, sheet cake, ring and muffin.

While this invention has been described in detail with particular reference to preferred embodiment thereof, it will be understood that variations and modifications will be effected within the spirit and scope of the invention as described herein and as defined in the appended claims.

We claim:

1. Baking dish comprising a generally shallow platter made of a material suitable to withstand a baking environment and having a baking surface defining a supporting plane on which a baked product can be made; a substantially upright continuous wall in the form of a ring generally conforming to the shape of said baking surface and having a height dimension when supported on said baking surface relative to said supporting plane to define a generally cylindrical space for receiving and containing a food product to be baked, said platter and ring having substantially conforming peripheries; first attaching means on said platter and second attaching means on said ring for removably attaching said ring to said platter about said peripheries for providing a generally sealed connection at the mating surfaces of said platter and wall; and a cover having a substantially upright continuous wall conforming to said periphery of said baking surface and being closed at one end and open at the other end in planes normal to said upright wall of said cover, said cover being provided with second attaching means for removably attaching said cover to said plate, whereby said ring can be initially attached to said platter for baking a food product and substantially said ring can be replaced by said cover to store the baked product within a substantially sealed enclosure.

2. Baking dish as defined in claim 1, wherein said platter is formed of a ceramic material.

3. Baking dish as defined in claim 2, wherein said ceramic is glazed.

4. Baking dish as defined in claim 1, wherein said conforming peripheries are circular.

5. Baking dish as defined in claim 1, wherein said ring is made of silicone.

6. Baking dish as defined in claim 1, wherein said cover is made of a clear material.

7. Baking dish as defined in claim 6, wherein said cover is made from a clear polycarbonate.

8. Baking dish as defined in claim 5, wherein said ring has a wall reinforced by a plurality of spaced ribs extending about said periphery of said ring.

9. Baking dish as defined in claim 1, wherein said platter is provided with a generally flat baking surface, and a skirt that serves as a spacer to raise said baking surface about a support surface on which the baking dish is positioned.

10. Baking dish as defined in claim 1, further comprising gripping means on said platter to facilitate gripping and movement of the platter.

11. Baking dish as defined in claim 10, wherein said gripping means comprises an annular rim projecting radially outwardly from said platter.

12. Baking dish as defined in claim 1, wherein said first attaching means comprises a protuberance extending from said platter and said second attaching means comprises an deflectable engaging member for snappingly and releasably engaging said protuberance.

13. Baking dish as defined in claim 1, further comprising a rim along said periphery of said ring along a remote end of said cover relative to said platter to facilitate removal of said ring following completion of baking.

* * * * *